G. D. EDMONSON.
SPECTACLES.
No. 65,800. Patented June 18, 1867.
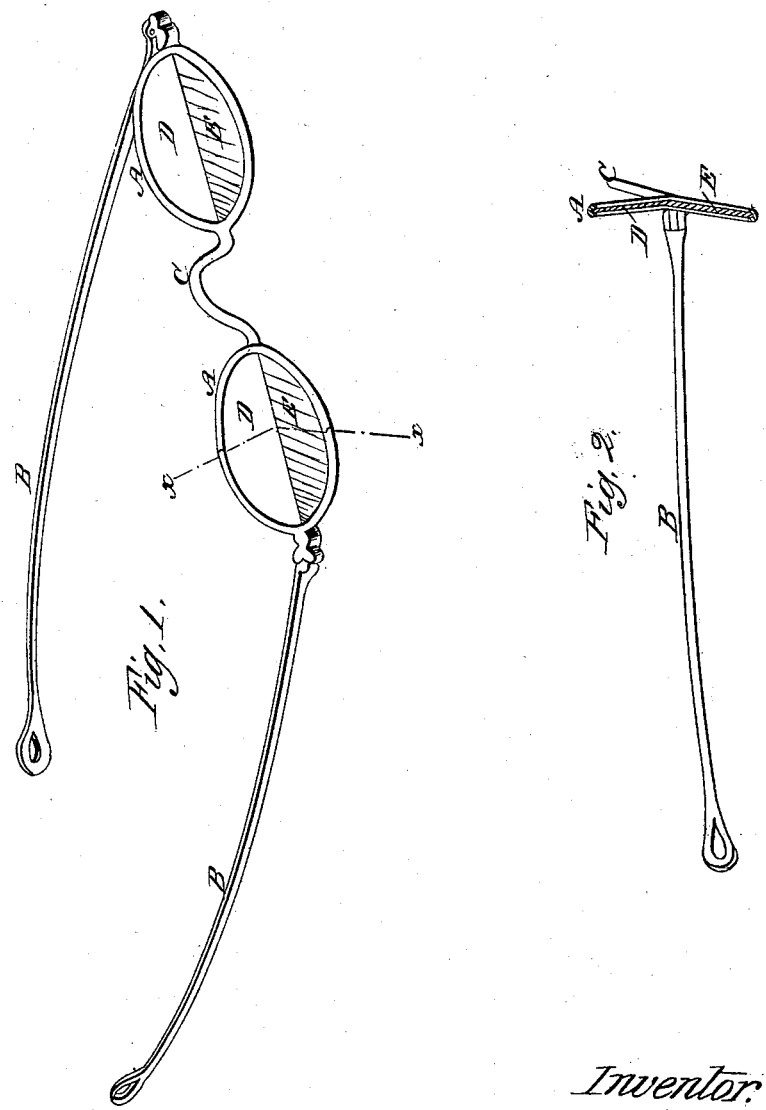

United States Patent Office.

GEORGE D. EDMONDSON, OF DETROIT, MICHIGAN, ASSIGNOR TO HIMSELF AND ALBERT R. CLARK, OF SAME PLACE.

Letters Patent No. 65,800, dated June 18, 1867.

---

IMPROVEMENT IN SPECTACLES.

---

The Schedule referred to in these Letters Patent and making part of the same.

---

TO ALL WHOM IT MAY CONCERN:

Be it known that I, GEORGE D. EDMONDSON, of Detroit, in the county of Wayne, and State of Michigan, have invented certain new and useful Improvements in Spectacles; and I do hereby declare the following to be a full, clear, and exact description of the nature, construction, and operation of the same, sufficient to enable others skilled in the art to which my invention appertains to make and use the same, reference being had to the accompanying drawings, which are made part of this specification, and in which—

Figure 1 is a perspective view.

Figure 2 is a section on the line $x\ x$, fig. 1.

Each lens consists of two pieces, of different magnifying powers, and set in different planes. The line of division between the two is the horizontal mid-section; the upper portion is of greater focal distance for viewing more distant objects. The plane of the upper portion is at right angles to that of the bows, and at about the same angle to the axis of the eyes when adjusted horizontally. The plane of the lower halves is inclined to the former so as to be about at right angles to the axis of the eyes when declined in reading, &c.

In the drawings, A A are the bezels, which confine the lenses; B the bows, by which the spectacles are clasped to the head; and C the bridge by which they are supported in position. The lenses in each case consist of two pieces. The upper half, D, is of a longer focal distance than the other, that is, less convex; it is designed for distant objects such as ordinarily seen by a party walking, objects which are assumed to be about the height of the eye and short distances above and below. The lower half, E, is of a more convex character, so as to suit the eye for reading, writing, needlework, &c., for which purpose a stronger power is generally required, as is familiarly instanced in the case of a person reading with spectacles and looking over them at persons or other ordinary objects at a greater distance than the book. It is desired to maintain the proper relative positions of the two portions to the axis of the eyes, and to secure this the upper half is in a plane at right angles to the bows B, so that the portion D meets the requirements of the eye when looking straight forward at the scene, and the portion E is at such an angle with the portion D as will correspond to the ordinary declination of the axis of the eyes in reading, &c. This adjustment of focal length and plane to the varying conditions and requirements is a valuable and hitherto undeveloped feature in spectacles.

I have heretofore spoken of the invention in reference to the use of convex glasses, in which case the upper portion has the least power, but my improvement is also adapted for glasses for those troubled with myopia, in which case the upper half would be the stronger power, more concave than the lower.

Having described my invention, what I claim therein as new, and desire to secure by Letters Patent, is—

The spectacles with lenses, each of which consists of two pieces of different relative convexity, and set at a different angle in the bezel, substantially as described.

GEORGE D. EDMONDSON.

Witnesses:
    DAN'L JACKSON,
    O. P. HURD.